United States Patent
Pepitone et al.

(10) Patent No.: US 10,053,224 B2
(45) Date of Patent: Aug. 21, 2018

(54) SYSTEM AND METHOD FOR PROVIDING AIRCRAFT LATERAL NAVIGATION CAPABILITY FEEDBACK TO A PILOT

(71) Applicant: HONEYWELL INTERNATIONAL INC., Morris Plains, NJ (US)

(72) Inventors: Dave Pepitone, Sun City West, AZ (US); John Meeker, Albuquerque, NM (US); Mark Giddings, Mesa, AZ (US); Ivan Sandy Wyatt, Scottsdale, AZ (US); John Suddreth, Cave Creek, AZ (US); Aaron Gannon, Anthem, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/171,417

(22) Filed: Jun. 2, 2016

(65) Prior Publication Data
US 2017/0349295 A1    Dec. 7, 2017

(51) Int. Cl.
*B64D 43/00* (2006.01)
*G06F 3/14* (2006.01)
*G09G 5/391* (2006.01)
*G09G 5/02* (2006.01)
*G06T 11/60* (2006.01)
(Continued)

(52) U.S. Cl.
CPC ............ *B64D 43/00* (2013.01); *G01C 23/005* (2013.01); *G06F 3/04817* (2013.01); *G06F 3/14* (2013.01); *G06T 11/60* (2013.01); *G08G 5/003* (2013.01); *G09G 5/02* (2013.01); *G09G 5/391* (2013.01); *G06T 2210/36* (2013.01);
(Continued)

(58) Field of Classification Search
None
See application file for complete search history.

(56) References Cited

U.S. PATENT DOCUMENTS 6,038,498 A    3/2000    Briffe et al.
6,085,129 A    7/2000    Schardt et al.
(Continued)

FOREIGN PATENT DOCUMENTS

JP    2002293297 A    10/2002

OTHER PUBLICATIONS

Shish, K. et al; Trajectory Prediction and Alerting for Aircraft Mode and Energy State Awareness; American Institute of Aeronautics and Astronautics, 2015.
(Continued)

*Primary Examiner* — Kee M Tung
*Assistant Examiner* — Yanna Wu
(74) *Attorney, Agent, or Firm* — Lorenz & Kopf, LLP

(57) ABSTRACT

A system method for providing aircraft lateral navigation system capability feedback to a pilot includes determining, in a processor, when a flight plan has been received that includes a flight leg that needs to be captured by the aircraft. A determination is made, in the processor, when an armed signal has been received, where the armed signal indicating that an aircraft autopilot navigation mode (NAV) has been armed. The processor is used to command a display device to render the flight leg using a first display paradigm when the armed signal has not been received, and to render the flight leg using a second display paradigm when the armed signal has been received.

10 Claims, 8 Drawing Sheets

(51) Int. Cl.
*G06F 3/0481* (2013.01)
*G08G 5/00* (2006.01)
*G01C 23/00* (2006.01)

(52) U.S. Cl.
CPC ...... *G06T 2210/61* (2013.01); *G09G 2320/10* (2013.01); *G09G 2340/0407* (2013.01); *G09G 2380/12* (2013.01)

(56) References Cited

U.S. PATENT DOCUMENTS

| | | |
|---|---|---|
| 6,892,118 B1 | 5/2005 | Feyereisen |
| 9,132,913 B1 | 9/2015 | Shapiro et al. |
| 2008/0004757 A1* | 1/2008 | Ingram ................ G08G 5/0039 701/11 |
| 2012/0296499 A1* | 11/2012 | Kirchhofer ............ G01C 23/00 701/3 |
| 2013/0060466 A1* | 3/2013 | Gurusamy ........... G01C 23/005 701/465 |
| 2015/0019047 A1 | 1/2015 | Chandrashekarappa et al. |

OTHER PUBLICATIONS

Boeing 737 Flight Instruments; The 737 Technical Site; Retrieved from Internet Feb. 11, 2016, http://www.b737.org.uk/flightinsts.htm.

Extended EP Search Report for Application No. 17170305.1-1557 dated Nov. 27, 2017.

* cited by examiner

SYSTEM AND METHOD FOR PROVIDING AIRCRAFT LATERAL NAVIGATION CAPABILITY FEEDBACK TO A PILOT

TECHNICAL FIELD

The present invention generally relates to providing feedback to aircraft pilots, and more particularly relates to systems and methods for providing multisensory and visualization aircraft lateral navigation capability feedback to pilots.

BACKGROUND

Numerous aircraft avionic systems, such as autopilot and flight management systems (FMS), are replete with numerous operational modes. The permutations of these operational modes can cause uncertainty as to what these systems are presently doing, what these systems may do next (including when and where), and what these systems will not do, and why. To assist in alleviating this uncertainty, most aircraft include a display called the Flight Mode Annunciator (FMA).

The basic functionality of the FMA has not changed in over 50 years. Indeed, many current cockpit computer displays simply mimic incandescent lamps of the past. For complex path management in the modern National Airspace System (NAS), the FMA may not reveal enough information, quickly enough, to ensure pilots do not make a path error. Moreover, the FMA design does not naturally communicate what aircraft systems will NOT do. This can cause errors of omission, which can result in operational deviations, because the system didn't do (or communicate about) something it half-knew it was supposed to do. For instance, in modern commercial aircraft, the likelihood of missing a descent target is increased when pilots partially arm, but fail to fully arm, a vertical navigation (VNAV) mode.

Consider, for example, a lateral transition, where an aircraft is on a vector (e.g., heading mode or track mode), but wishes to intercept a flight leg in a flight plan, such as a final approach course. Presently, it can be unclear, just from looking at the lateral map rendered on the display, whether the aircraft will actually capture the flight leg. To confirm the aircraft will capture, the pilot must also look at the FMA. The FMA, however, only conveys textual information that a mode is armed, but provides no information regarding mode capture (e.g., where, when, if, or why). Thus, current flight decks do not communicate the armed and active states of lateral modes in a telling, easily understood manner that is readily available to the pilot.

Hence, there is a need for a system and method of providing aircraft lateral navigation capability feedback to aircraft pilots in a telling, easily understood manner that is readily available to the pilot. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for providing aircraft lateral navigation system capability feedback to a pilot includes a display device and a processor. The display device is configured to render images. The processor is in operable communication with the display device, and is coupled to receive a flight plan that includes a flight leg that needs to be captured by the aircraft. The processor is further coupled to selectively receive an armed signal indicating that an aircraft autopilot navigation mode (NAV) has been armed. The processor is configured to command the display device to render a lateral map image that includes at least a portion of the flight leg that needs to be captured, and is further configured to: (i) determine when the armed signal has been received, (ii) command the display device to render the flight leg using a first display paradigm when the armed signal has not been received, and (iii) command the display device to render the flight leg using a second display paradigm when the armed signal has been received.

In another embodiment, a method for providing aircraft lateral navigation system capability feedback to a pilot includes determining, in a processor, when a flight plan has been received that includes a flight leg that needs to be captured by the aircraft. A determination is made, in the processor, when an armed signal has been received, where the armed signal indicating that an aircraft autopilot navigation mode (NAV) has been armed. The processor is used to command a display device to render the flight leg using a first display paradigm when the armed signal has not been received, and to render the flight leg using a second display paradigm when the armed signal has been received.

In yet another embodiment, a system for providing aircraft lateral navigation system capability feedback to a pilot includes a display device and a processor. The display device is configured to render images. The processor is in operable communication with the display device, and is coupled to receive a flight plan that includes a flight leg that needs to be captured by the aircraft. The processor is further coupled to selectively receive an armed signal indicating that an aircraft autopilot navigation mode (NAV) has been armed. The processor is configured to command the display device to render a lateral map image that includes at least a portion of the flight leg that needs to be captured, and is further configured to: (i) command the display device to render an aircraft icon at a position on the lateral map that corresponds to current aircraft lateral position, the rendered aircraft icon oriented to indicate direction of travel of the aircraft, (ii) command the display device to render a trajectory line graphic extending from the aircraft icon in the direction of travel, (iii) determine when the armed signal has been received, (iv) command the display device to render the flight leg using a first display paradigm when the armed signal has not been received, and (v) command the display device to render the flight leg using a second display paradigm when the armed signal has been received.

Furthermore, other desirable features and characteristics of the aircraft lateral navigation capability feedback system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
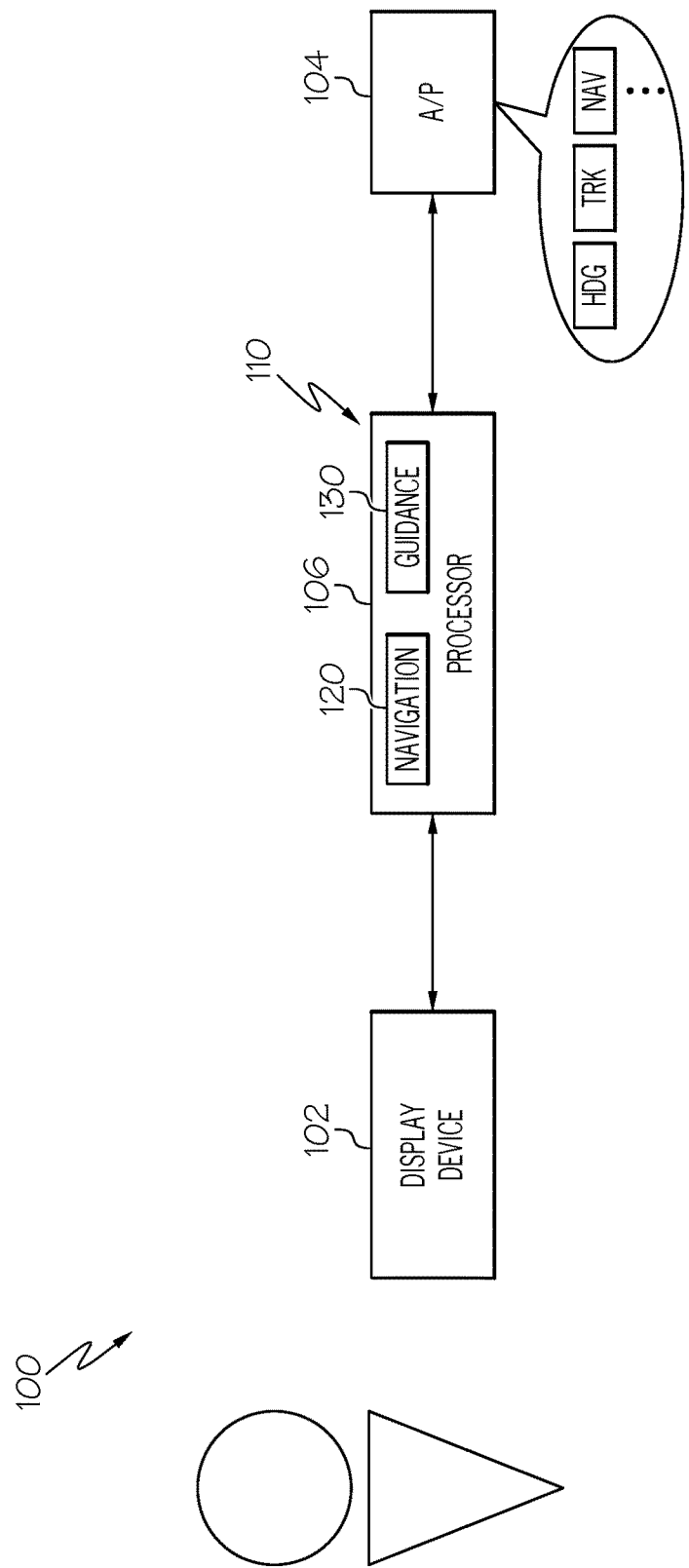
FIG. 1 is a functional block diagram of one embodiment of an aircraft system for providing aircraft lateral navigation system capability feedback to a pilot.

Referring first to FIG. 1, a functional block diagram of one embodiment of an aircraft system 100 for providing aircraft lateral navigation system capability feedback to a pilot is depicted, and includes a display device 102, an automatic pilot (autopilot) 104, and a processor 106. The display device 102 is configured, in response to image rendering display commands received from the processor 106, to render various types of images. Some of the images the display device 102 renders will be described in more detail further below.

The display device 102 may vary in configuration and implementation. For example, the display device 102 may be configured as any one of numerous types of aircraft avionics displays including, but not limited to, a multi-function display (MFD), a primary flight display (PFD), or a horizontal situation indictor (HSI), just to name a few. Moreover, the display device may be implemented using any one of numerous types of display technologies including, but not limited to, various cathode ray tube (CRT) displays, various liquid crystal displays (LCDs), various light emitting diode (LED) displays, various plasma displays, various head down displays (HDDs), various projection displays, and various head up displays (HUDs), just to name a few.

The autopilot 104, when it is engaged, is responsive to guidance commands to generate suitable actuator commands that function to control the flight characteristics of the aircraft via various non-illustrated actuators. The guidance commands, as will be described further below, may be supplied from, for example, a flight management system (FMS). Before proceeding further, it is noted that the depicted autopilot 104 also implements the functionality of a flight director, which, as is generally known, may also provide the guidance commands. In other embodiments, the flight director may be implemented separate from the autopilot.

As FIG. 1 further depicts, the autopilot 104 may be operated in any one of numerous modes. The number and types of autopilot modes may vary, depending, for example, on the particular autopilot 104. The modes, which in some embodiments may be selected via a non-illustrated mode control panel (MCP), include at least a HDG (heading) mode, a TRK (track) mode, and a NAV (navigation) mode, each of which will be briefly described. Before doing so, however, it will be appreciated that most autopilots 104 will include additional operational modes. However, a description of these additional modes is not needed to enable the embodiments described herein. Thus, the descriptions and depictions of these additional modes are not included. Moreover, it will be appreciated that the NAV mode, as used herein, includes NAV (lateral navigation), RNP (required navigation performance), and any other mode that will capture a planned lateral path, be it ground-based NAV, RNAV, straight, or curved.

In the HDG mode, the autopilot 104 will point the aircraft in a preset heading and maintain that heading. In the TRK mode, the autopilot 104 uses, for example, global positioning system (GPS) to maintain the ground track of the aircraft on a straight line toward preset heading. As is generally known, if there is a crosswind while in the HDG mode, the aircraft ground track will drift with the crosswind. Conversely, if there is a crosswind while in the TRK mode, the autopilot 104 will adjust the aircraft heading to maintain a straight line over the ground. In the NAV mode, the autopilot controls the lateral navigation of the aircraft to fly and/or capture, for example, a preset flight plan that has been set, for example, in the FMS.

Before proceeding further, it should be noted that although the autopilot 104 is, for clarity and ease of depiction, illustrated as being implemented separate from the processor 106. It will be appreciated that the autopilot 104 functionality may, in some embodiments, be implemented in the processor 106.

The processor 106 is in operable communication with the display device 102 and the autopilot 104. The processor 106 is coupled to receive various signals from the autopilot 104. These signals include, for example, an autopilot mode signal, which indicates an active mode of the autopilot, and an autopilot armed signal, which indicates an autopilot mode is armed and ready to become the active mode when the logic for its activation is met. The processor 106 is configured, in response to the received signals, to, among other functions, provide aircraft lateral navigation system capability feedback. The aircraft lateral navigation system capability feedback function will be described in more detail momentarily. Before doing so, however, it should be understood that although the processor 106 is depicted in FIG. 1 using a single functional block, the exemplary embodiments are not so limited. Indeed, in some embodiments the processor 106 may be implemented using a plurality of processors, components, or subcomponents of various systems located either onboard or external to an aircraft. The processor 106 may be implemented using any one (or a plurality) of numerous known general-purpose microprocessors or application specific processor(s) that operate in response to program instructions. The processor 106 may also be implemented using various other circuits, not just a programmable processor. For example, digital logic circuits and analog signal processing circuits could also be used. In this respect, the processor 106 may include or cooperate with any number of software programs or instructions designed to carry out various methods, process tasks, calculations, and control/display functions described herein. Furthermore, the systems and methods described herein are not limited to manned aircraft and can also be implemented for other types of vehicles, such as, for example, spacecraft or unmanned vehicles.

In the depicted embodiment, the processor 106 is configured to implement a flight management system (FMS) 110. It will be appreciated, however, that the processor 106 may additionally be configured to implement any one of numerous other functions in an aircraft. For example, and as already mentioned, the processor 106 may be configured to implement the autopilot 104 functionality. As is generally known, and as FIG. 1 further depicts, the FMS 110 may include a navigation system 120 and a guidance system 130. An FMS 110, as is generally known, is configured to perform a wide variety of in-flight tasks during operation of an aircraft. These tasks include aircraft navigation and guidance, which are implemented, at least in the depicted embodiment, by the navigation system 120 and the guidance system 130, respectively. Although not specifically shown, the FMS 110 may additionally include a database with any elements necessary for the operation of the aircraft and the creation and implementation of a flight plan, including waypoints, airports, terrain information and applicable flight rules. Moreover, at least in some embodiments, the previously mentioned non-depicted MCP may be used to set and arm guidance targets.

The navigation system 120 determines the current kinematic state of the aircraft. As such, in the exemplary embodiment, the navigation system 120 includes any suitable position and direction determination devices, such as an inertial reference system (IRS), an air-data heading reference system (AHRS), radio navigation aids, or a global navigation satellite system (GNSS). For example, the navigation system 120 provides at least the current position and velocity of the aircraft to the guidance system 130. Other navigation information may include the current heading, current course, current track, altitude, pitch, path, and any desired flight information.

The guidance system 130 uses various flight and engine models and algorithms to construct lateral and vertical profiles for various segments that make up a flight plan based on navigation information received from the navigation system 120 (e.g., the current position and velocity) and inputs from the pilot or other source (e.g., the desired destination). As examples, the guidance system 130 may generate the flight plan based on considerations for timing, position, altitude, speed targets, and fuel economy. The guidance system 130 may also consider aircraft-specific parameters such as weight, fuel, and atmospheric conditions. In one scenario, aspects of the flight plan may be dictated by Air Traffic Control (ATC), Federal Aviation Administration (FAA) rules, or European Aviation Safety Agency (EASA) rules.

The flight plan may include a number of flight legs between waypoints, each of which has an associated position, altitude, speed, and time that the aircraft is scheduled to fly. The guidance system 130 generates, as previously mentioned, the guidance commands that are supplied to the autopilot system 104. For example, the commands generated by the guidance system 130 associated with the flight plan may include pitch commands, pitch rate commands, roll commands, and speed targets that function to implement the lateral and vertical profiles. Before proceeding further, it is noted that the FMS 110 is particularly discussed as controlling the aircraft to capture a flight leg of a flight plan, although the exemplary embodiments discussed herein are equally applicable to other flight scenarios.

Figure 2:
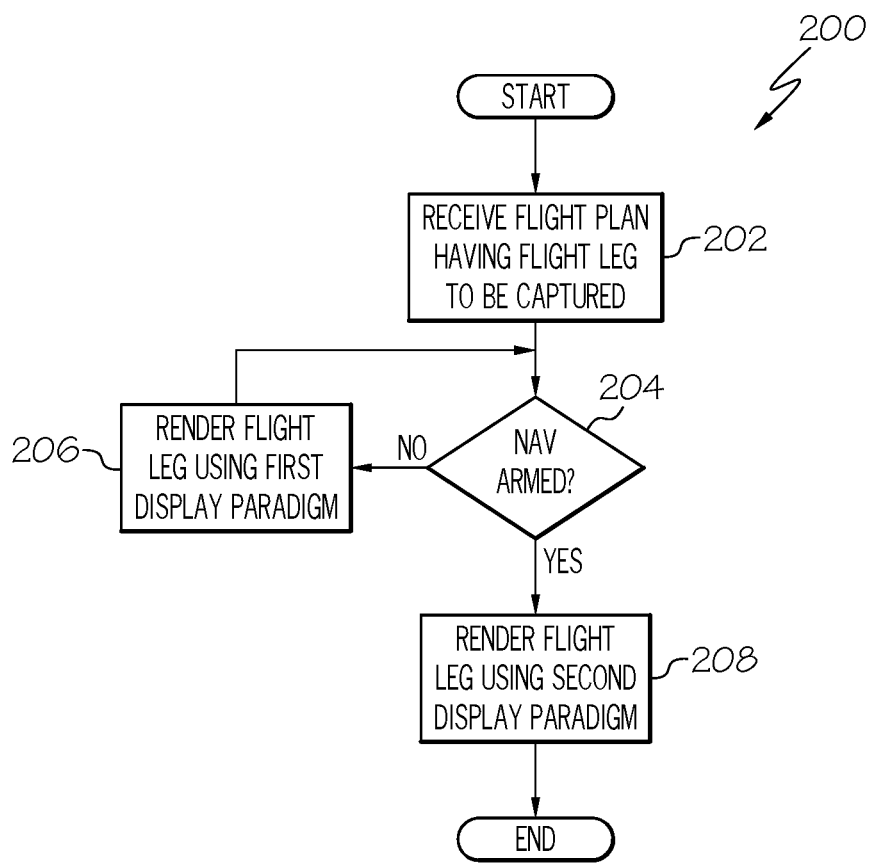
FIG. 2 depicts a process, in flowchart form, that may be implemented in the system of FIG. 1 for providing aircraft lateral navigation system capability feedback.

As noted above, the processor 106 is configured, in addition to the above-described functions, to implement a process that provides aircraft lateral navigation system capability feedback to a pilot. The general process 200, which is depicted in flowchart form in FIG. 2, includes the processor 106 receiving a flight plan that includes a flight leg that needs to be captured by the aircraft (202). The processor 106 then determines when the aircraft autopilot NAV mode has been armed (204) and, based on this determination, commands the display device 102 to render a lateral map image that includes at least a portion of the flight leg that needs to be captured using either a first or a second display paradigm. Specifically, when the NAV mode has not been armed, the processor 106 commands the display device 102 to render the flight leg using the first display paradigm (206), and continues to do so until the NAV mode has been armed. When the NAV mode has been armed, the processor 106 commands the display device 102 to render the flight leg using the second display paradigm (208).

It will be appreciated that the first and second display paradigms may vary. To even more clearly describe and depict the aircraft lateral navigation system capability feedback functionality of the system 100, and to even more clearly describe and depict embodiments of the first and second display paradigms, one particular instantiation of the process depicted in FIG. 2 will now be described. For this particular instantiation, the active mode of the autopilot 104 is initially the TRK mode, and the pilot wants to capture a flight leg of a flight plan and for the active mode of the autopilot 104 to transition the NAV mode. It will be understood by persons of skill in the art that the depicted process is generally the same when the active mode of the autopilot 104 is initially the HDG mode. Slight variations associated with the HDG mode, which are optional, will be briefly described further below.

Figure 3:
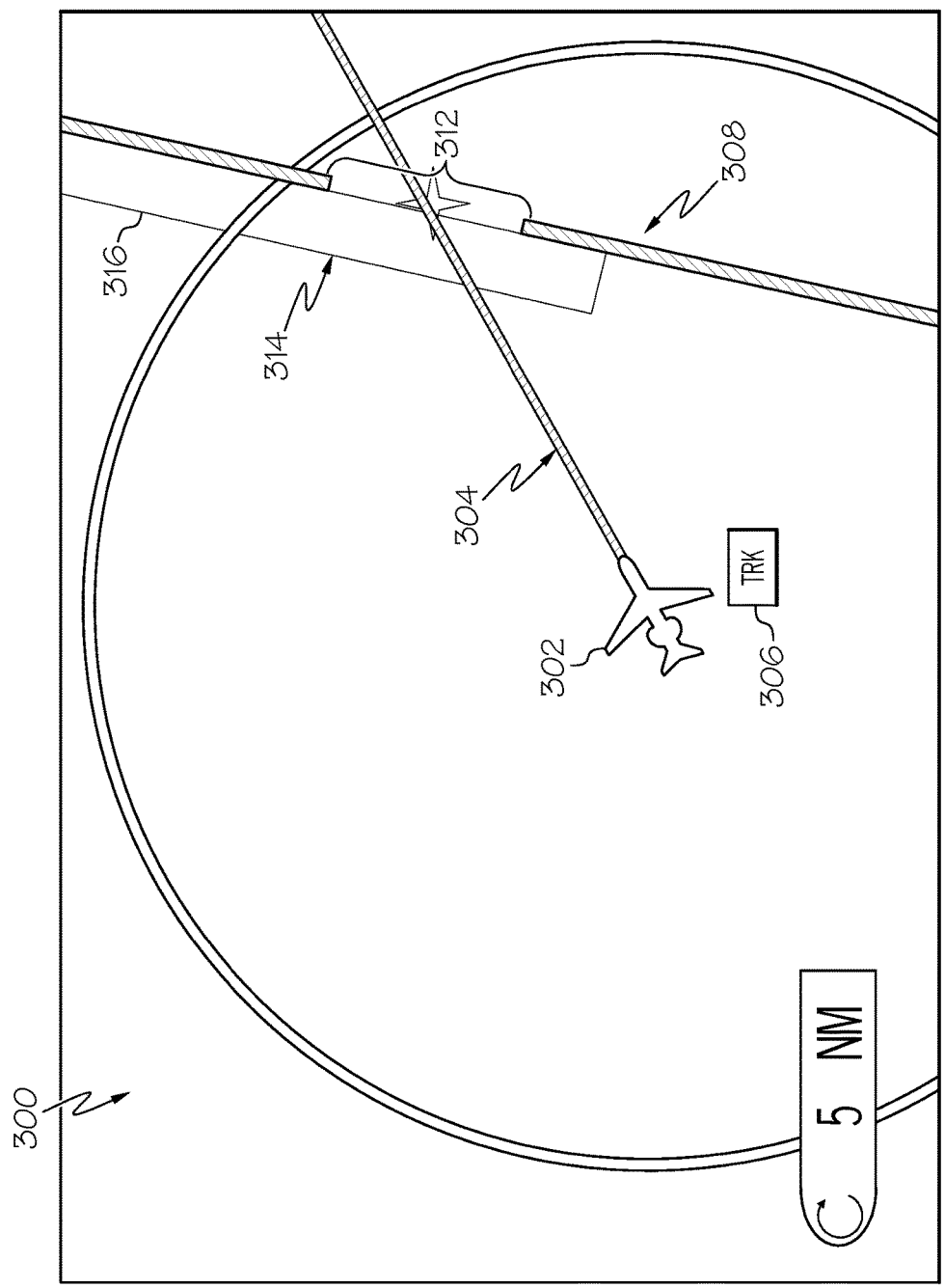
FIGS. 3-6 graphically depict one instantiation of the process of FIG. 2 that may be implemented by the system of FIG. 1.

Referring first to FIG. 3, an embodiment of an image 300 rendered by the display device 102 is depicted. The image 300, which is a lateral map, includes an aircraft icon 302 and a trajectory line graphic 304. The aircraft icon 302 is rendered at a position on the lateral map 300 that corresponds to the current aircraft lateral position, and is oriented to indicate the direction of travel of the aircraft. The trajectory line graphic 304 extends from the aircraft icon 302 in the direction of travel. In the depicted embodiment, the trajectory line graphic 304 extends to the border of the display area.

The processor 106, as previously noted, is coupled to receive an autopilot mode signal that indicates the active mode of the autopilot 104. The processor 106 is configured, in response to the autopilot mode signal, to command the display device 102 to render, adjacent to the aircraft icon 302, a first textual icon 306 that is representative of the active mode. As noted, for this example the initial active mode of the autopilot 104 is the TRK mode. As such, the first textual icon 306 is rendered as "TRK" to indicate such.

The rendered image 300 also includes a flight leg 308 that has been rendered using the first display paradigm, thus clearly indicating to the pilot that the NAV mode has not been armed. In the depicted embodiment the first display paradigm comprises rendering the flight leg 308 with a discontinuity 312 that is located at the position where the aircraft will intersect the flight leg 308. In addition to including the discontinuity 312, the flight leg 308 is also rendered with a first, preferably degraded, resolution, or using a first visually distinguishable graphic format, such as stippling or other suitably distinguishable format.

Figure 4:
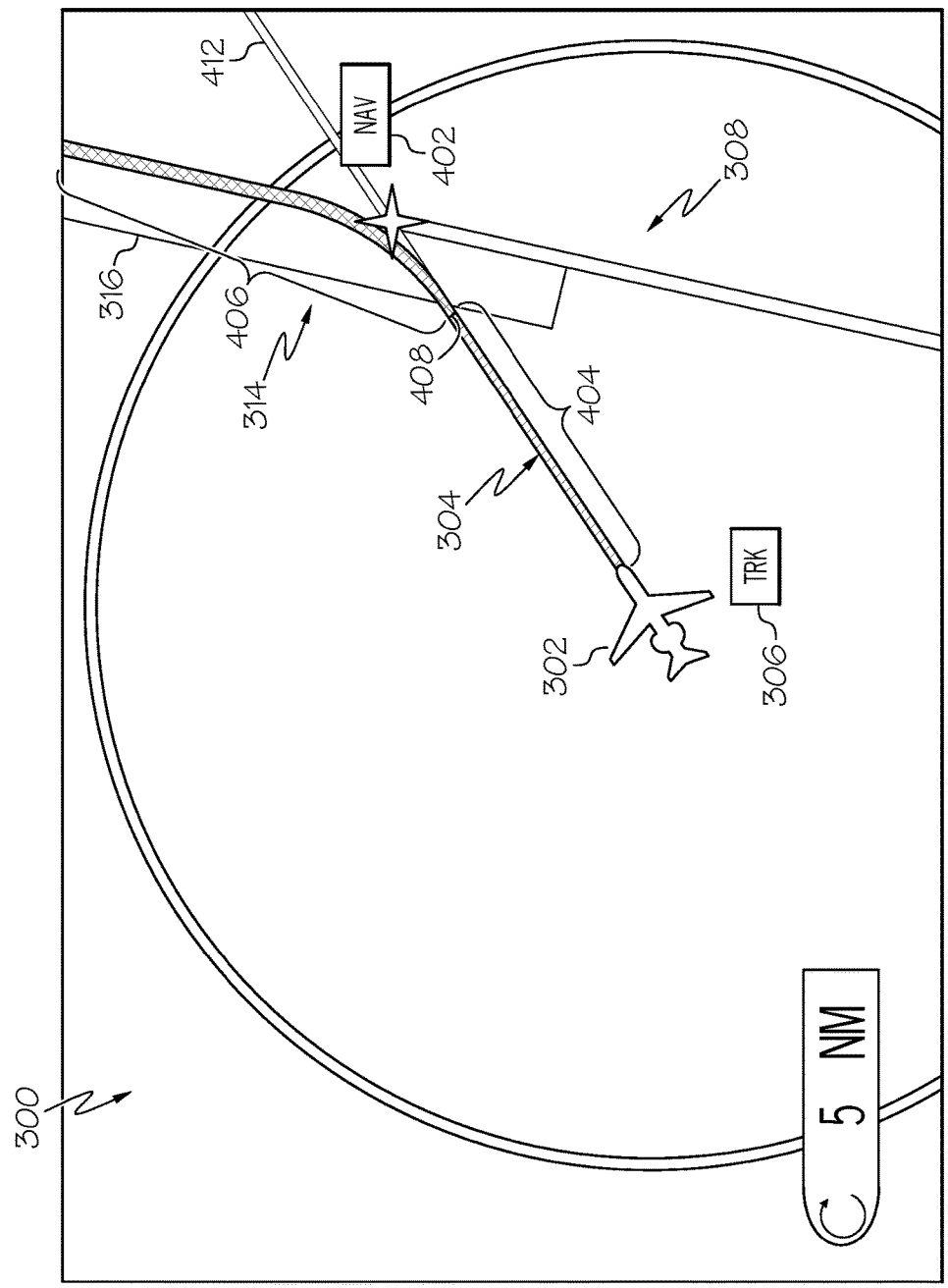

Referring now to FIG. 4, an embodiment of an image 400 rendered by the display device 102 when the NAV mode has been armed is depicted. The image 400 includes the aircraft icon 302, the trajectory line graphic 304, the first textual icon 306, and the flight leg 308. However, because the NAV mode has been armed, the flight leg 308 is rendered using the second display paradigm. In the depicted embodiment, the second display paradigm comprises rendering the flight leg 308 without the discontinuity 312, and with a second resolution, or second visibly distinguishable graphic format that is different from the first resolution or format. In the depicted embodiment, the portion of the flight leg 308 that is not covered over by the trajectory line graphic 304 is rendered using a relatively low intensity line style, and provides a reference line from the "from waypoint" (not depicted), in the direction the aircraft will not turn.

As FIG. 4 also depicts, the rendered image 400 additionally includes a second textual icon 402. The second textual icon 402, which is representative of the armed mode (e.g., NAV), is rendered adjacent to where the aircraft will capture the flight leg 308. In some embodiments, the second textual icon 402 is also rendered using a different color than the first textual icon 306, at least until the NAV mode becomes the active mode. Also, although the trajectory line graphic 304 continues to be rendered, a first section 404 of trajectory line graphic 308 is rendered in the first color, and a second section 406 is rendered in a second color that is different from the first color. The second section 406 shows the trajectory that the autopilot will command the aircraft to proceed along to capture, and then fly, the remainder of the flight leg 308. The second section 406 includes a start end 408 that coincides with the position at which the NAV mode becomes active and the autopilot 104 commands the aircraft to commence an actual turn-to-intercept maneuver. As FIG. 4 also depicts, when NAV becomes armed, the processor 106 also commands the display device 102 to render a second trajectory line graphic 412 that corresponds to the original direction of travel. The second trajectory line graphic 412 is preferably rendered in a third color that is different from the first and second colors.

Figure 5:
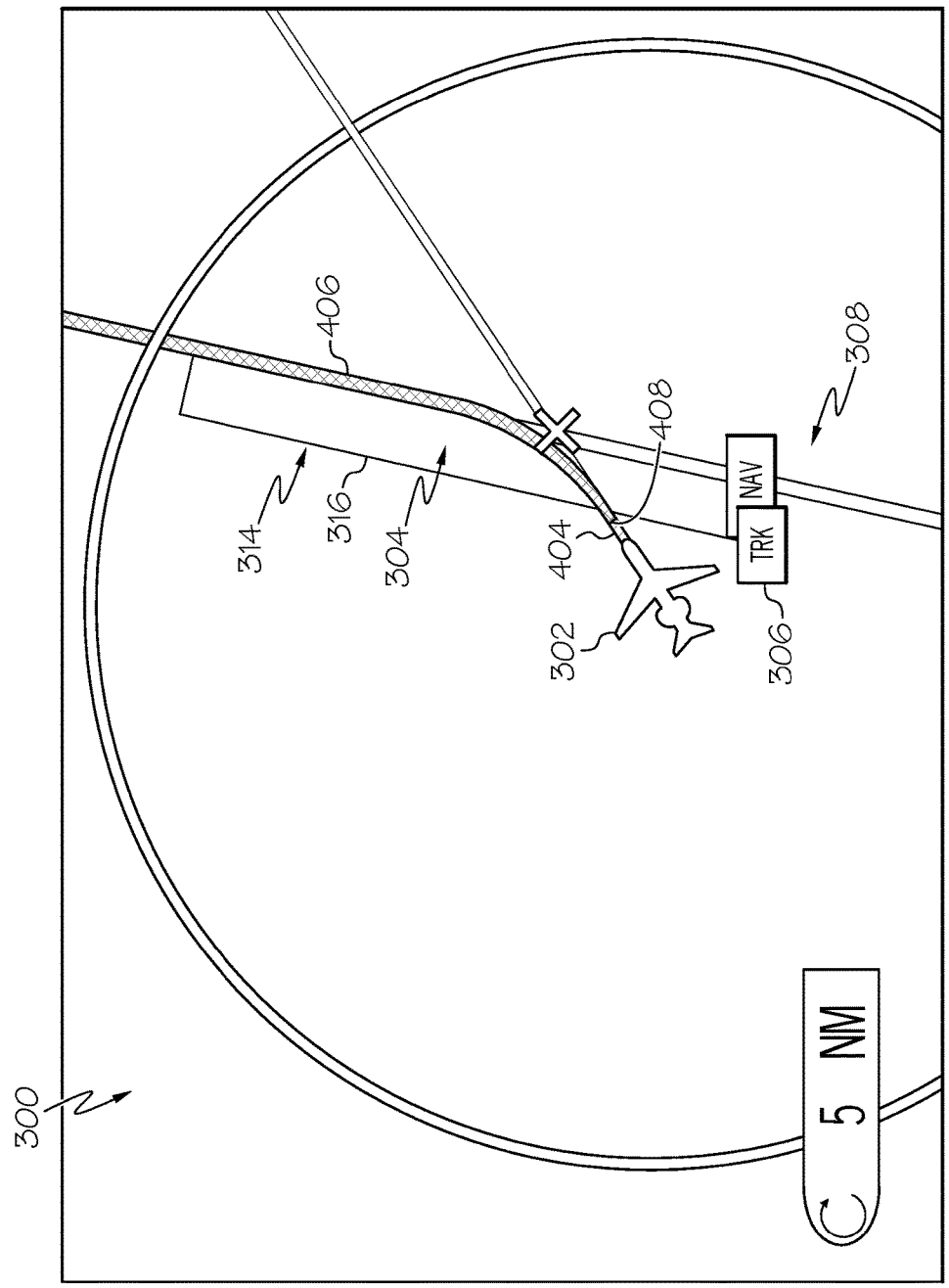
Figure 6:
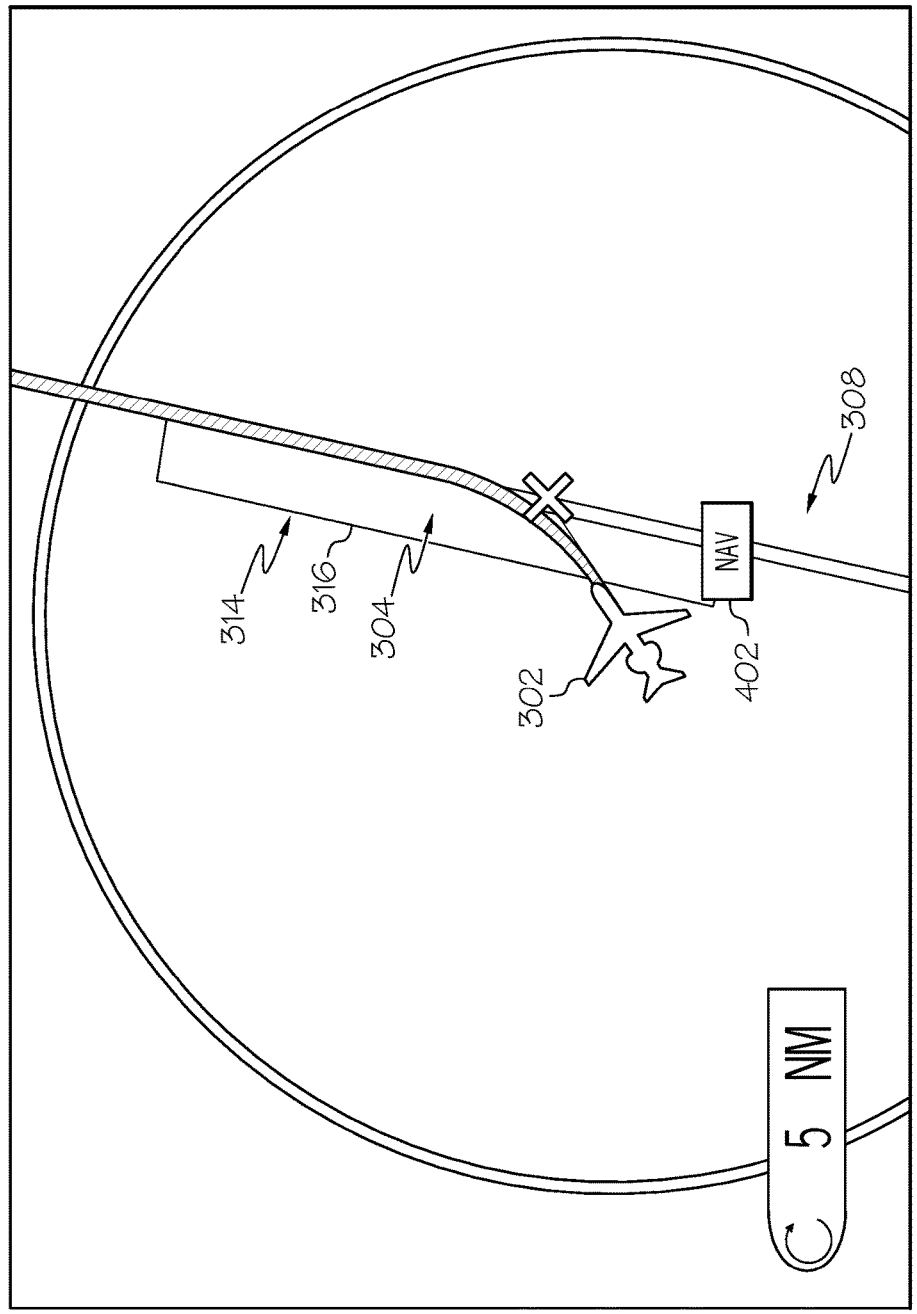

Referring now to FIG. 5, it should be noted that as the aircraft approaches the position where the NAV mode becomes active, and thus where the rendered aircraft icon 302 approaches the start end 408 of the second section 406, the length of the first section 404 will become smaller and smaller until, as FIG. 6 depicts, the aircraft icon 302 reaches the start end 408 of the second section 406. At that point, because the NAV mode is now active, the second section 406 is no longer rendered, and the trajectory line graphic 304 is rendered entirely in the first color, and continues to indicate the direction of travel of the aircraft. Also at that point, the first textual icon 308 (e.g., TRK) is no longer rendered; however, the second textual icon 402 (e.g., NAV) is now rendered adjacent to the aircraft icon 302.

The processor 106, in some embodiments, may also implement additional features to provide feedback to the pilot. For example, as FIGS. 3-6 depict, the processor 106 may additionally command the display device 102 to render a capture window 314. The capture window 314, which may be rendered as a transparent or semi-transparent rectangle, includes an outer boundary 316 that indicates a region in which the pilot may take action to arm the NAV mode, either by pressing the NAV button (or interacting with another user interface) or placing the aircraft in a configuration that will allow the NAV mode to be armed. Although FIGS. 4-6 depict the capture window 314 continuing to be rendered after the NAV mode is armed and active, it will be appreciated that in some embodiments the capture window 314 is no longer rendered after the NAV mode is armed. Moreover, as depicted in FIG. 5, in some embodiments as the aircraft icon 302 approaches the start end 408 of the second section 406, the first textual icon 306 will begin overlapping with second textual icon 406. Though not illustrated, thereafter the first textual icon 306 will gradually fade out and is wholly occluded by the second textual icon 406.

It was previously noted that the process described above is generally the same when the active mode of the autopilot 104 is initially the HDG mode, but that slight, though optional, variations in the manner in which the image is rendered. One such variation will now be described.

Figure 7:
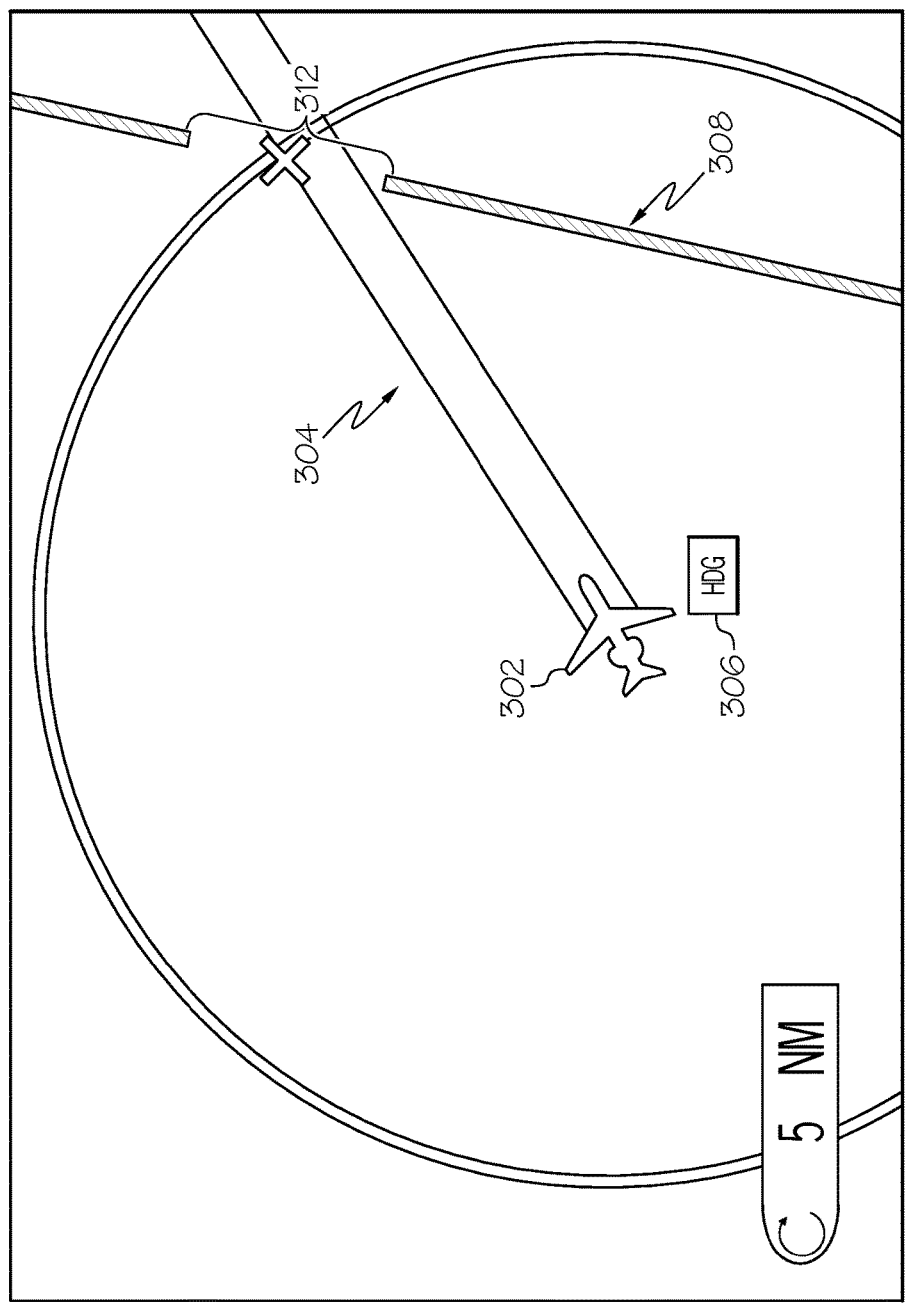
FIGS. 7 and 8 depict another instantiation of the process of FIG. 2 that may be implemented by the system of FIG. 1.
Figure 8:
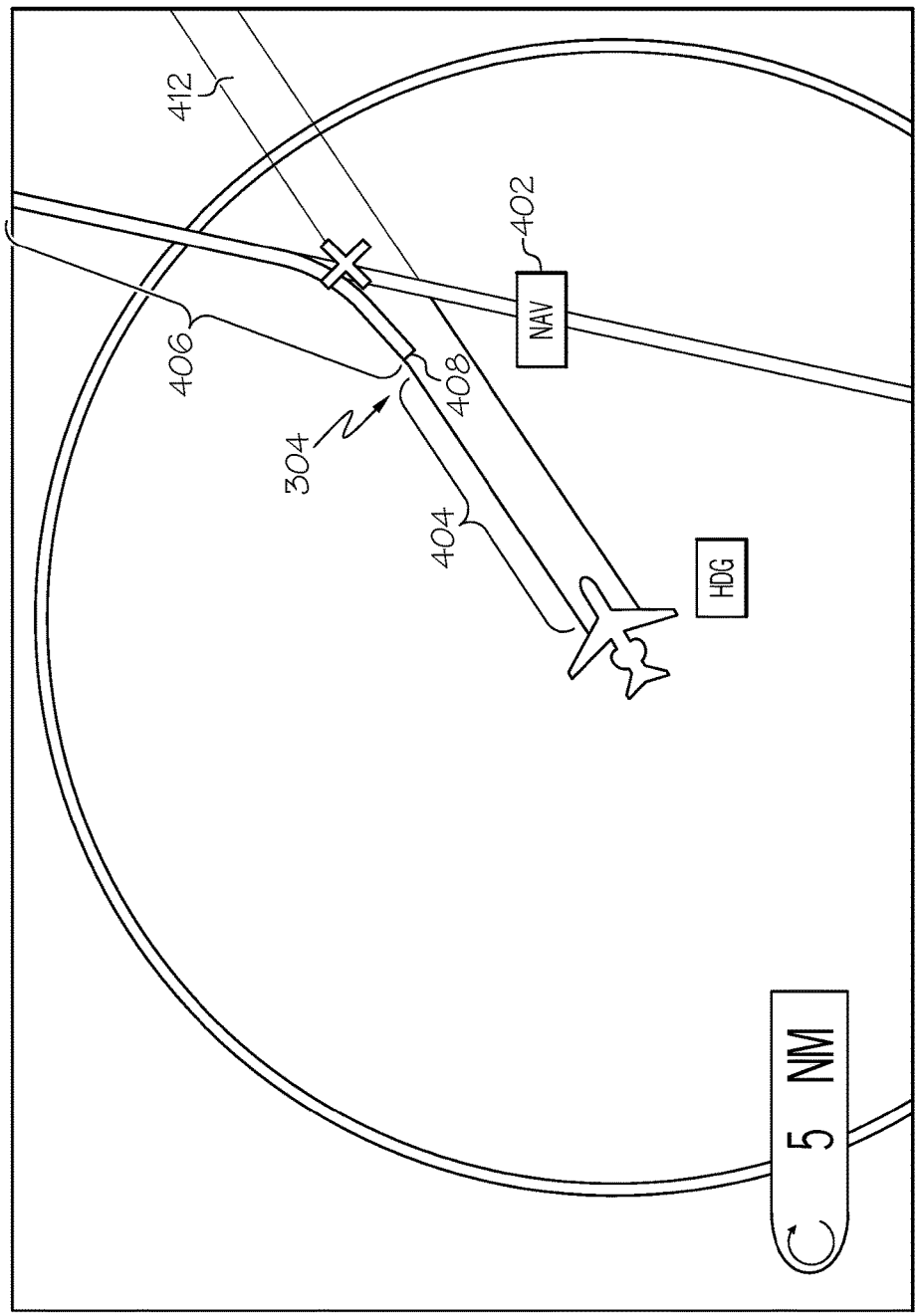

Referring to FIG. 7, it is seen that when the active mode of the autopilot 104 is initially the HDG mode, the trajectory line graphic 304 is wider than when the active mode of the autopilot 104 is the TRK mode. Though not depicted in FIG. 7, in the event there is a cross wind, the trajectory line graphic may not be linear, but may "bend" based on the strength of the cross wind. Moreover, as FIG. 8 depicts, when NAV becomes armed, the second trajectory line graphic 412, corresponds to the original direction of travel, is preferably rendered in the third color, but it too is wider than when the active mode of the autopilot 104 is the TRK mode. Here too, the portion of the flight leg 308 that is not covered over by the trajectory line graphic 304 is rendered using a relatively low intensity line style, and provides a reference line from the "from waypoint" (not depicted), in the direction the aircraft will not turn.

The system and method described herein provides aircraft lateral navigation system capability feedback to aircraft pilots to thereby prevent, or at least inhibit, latent errors of omission that may result in operational errors.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for providing aircraft lateral navigation system capability feedback to a pilot of an aircraft, comprising:
   a display device configured to render images; and
   a processor in operable communication with the display device, the processor coupled to receive a flight plan that includes a flight leg that needs to be captured by the aircraft, the processor further coupled to selectively receive an armed signal indicating that an aircraft autopilot lateral navigation mode (NAV) has been armed, the processor configured to command the display device to render a lateral map image that includes at least a portion of the flight leg that needs to be captured, the processor further configured to:
   (i) determine when the armed signal has been received,
   (ii) command the display device to render the flight leg that needs to be captured using a first display paradigm when the armed signal has not been received,
   (iii) command the display device to render the flight leg that needs to be captured using a second display paradigm when the armed signal has been received,
   (iv) command the display device to render an aircraft icon at a position on the lateral map that corresponds to current aircraft lateral position, the rendered aircraft icon oriented to indicate direction of travel of the aircraft, and
   (v) command the display device to render a trajectory line graphic extending from the aircraft icon in the direction of travel,
   wherein:
   the first display paradigm comprises rendering the flight leg that needs to be captured with a single discontinuity that is located at a position where the aircraft will intersect the flight leg,
   the second display paradigm comprises rendering the flight leg that needs to be captured without the single discontinuity,
   when the armed signal has not been received, the trajectory line graphic is rendered in a first color and extends through the discontinuity,
   when the armed signal has been received, the trajectory line graphic is rendered such that a first section thereof is rendered in the first color and a second section thereof is rendered in a second color that is different from the first color, and
   the second section extends through the discontinuity and includes a start point that coincides with a position at which the NAV becomes active and the aircraft autopilot will command the aircraft to commence an actual turn-to-intercept maneuver.

2. The system of claim 1, wherein:
   the first display paradigm comprises rendering the flight leg that needs to be captured with a first resolution, and
   the second display paradigm comprises rendering the flight leg that needs to be captured with a second resolution that is different from the first resolution.

3. The system of claim 1, wherein:
   the processor is further coupled to receive an autopilot mode signal that indicates an active mode of the autopilot; and
   the processor is further configured, in response to the autopilot mode signal, to command the display device to render a first textual icon adjacent to the aircraft icon, the first textual icon representative of the active mode of the autopilot.

4. The system of claim 3, wherein the processor is further configured, when the armed signal has been received, to command the display device to render a second textual icon adjacent to where the aircraft will capture the flight leg that needs to be captured.

5. The system of claim 3, wherein the processor is further configured, at least when the armed signal has not been received, to render a capture window adjacent the flight leg that needs to be captured, the capture window comprising an outer boundary that indicates a region in which a pilot may take action to arm the NAV mode.

6. A method for providing aircraft lateral navigation system capability feedback to a pilot of an aircraft, the method comprising the steps of:
   determining, in a processor, when a flight plan has been received that includes a flight leg that needs to be captured by the aircraft;
   determining, in the processor, when an armed signal has been received, the armed signal indicating that an aircraft autopilot lateral navigation mode (NAV) has been armed;
   commanding, using the processor, a display device to render the flight leg that needs to be captured using a first display paradigm when the armed signal has not been received,
   commanding, using the processor, the display device to render the flight leg that needs to be captured using a second display paradigm when the armed signal has been received,
   commanding, using the processor, the display device to render an aircraft icon at a position on the lateral map that corresponds to current aircraft lateral position, the rendered aircraft icon oriented to indicate direction of travel of the aircraft, and commanding, using the processor, the display device to render a trajectory line graphic extending from the aircraft icon in the direction of travel,
   wherein:
      the first display paradigm comprises rendering the flight leg that needs to be captured with a single discontinuity that is located at a position where the aircraft will intersect the flight leg,
      the second display paradigm comprises rendering the flight leg that needs to be captured without the single discontinuity,
      when the armed signal has not been received, the trajectory line graphic is rendered in a first color and extends through the discontinuity,
      when the armed signal has been received, the trajectory line graphic is rendered such that a first section thereof is rendered in the first color and a second section thereof is rendered in a second color that is different from the first color, and
      the second section extends through the discontinuity and includes a start point that coincides with a position at which the NAV becomes active and the aircraft autopilot will command the aircraft to commence an actual turn-to-intercept maneuver.

7. The method of claim 6, wherein:
   the first display paradigm comprises rendering the flight leg that needs to be captured with a first resolution, and
   the second display paradigm comprises rendering the flight leg that needs to be captured with a second resolution that is different from the first resolution.

8. The method of claim 6, further comprising:
   receiving, in the processor, an autopilot mode signal that indicates an active mode of the autopilot; and
   commanding, using the processor, the display device to render a first textual icon adjacent to the aircraft icon, the first textual icon representative of the active mode of the autopilot.

9. The method of claim 8, further comprising:
   commanding, using the processor, the display device to render a second textual icon adjacent to where the aircraft will capture the flight leg that needs to be captured when the armed signal has been received.

10. The method of claim 8, further comprising:
   commanding, using the processor, the display device to render, at least when the armed signal has not been received, a capture window adjacent the flight leg that needs to be captured, the capture window comprising an outer boundary that indicates a region in which a pilot may take action to arm the NAV mode.

\* \* \* \* \*